Aug. 27, 1935.  H. W. LEE  2,012,822
LENS FOR PHOTOGRAPHIC AND LIKE PURPOSES
Filed July 20, 1934
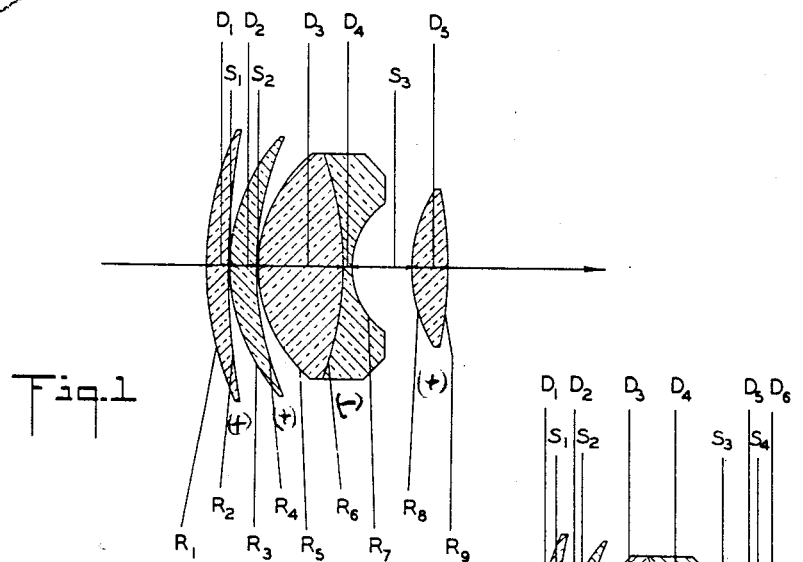
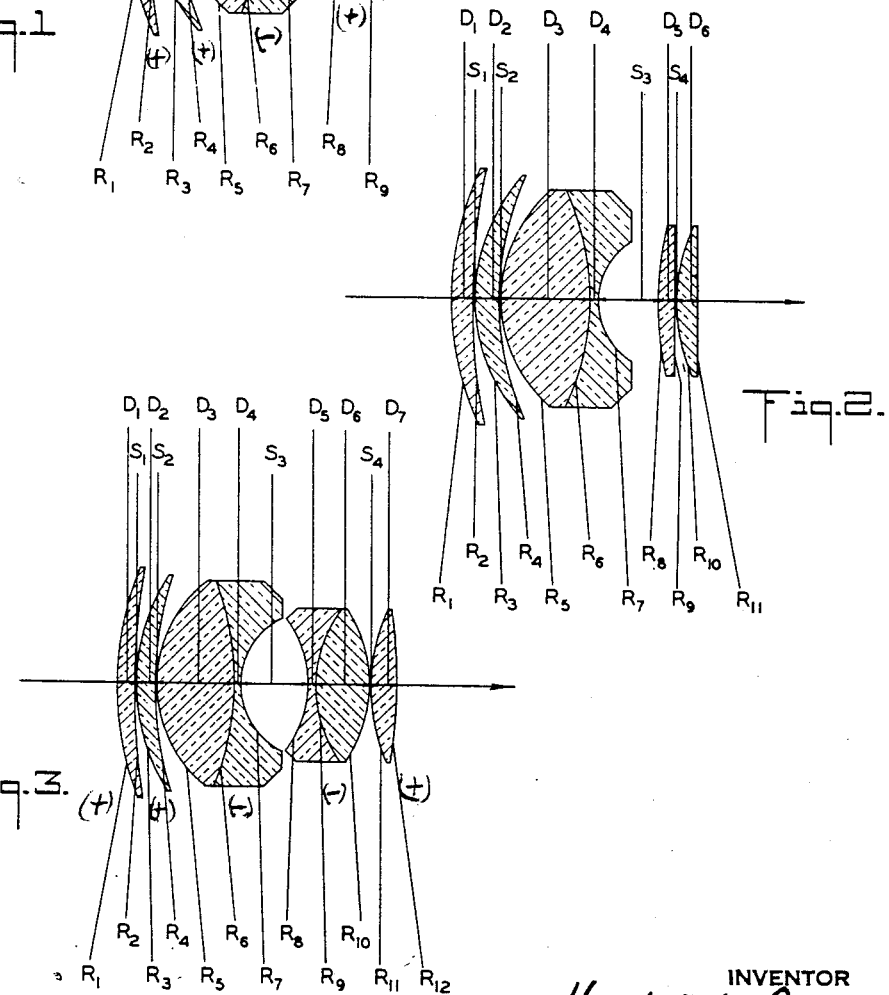
INVENTOR
Horace William Lee
BY
ATTORNEY Patented Aug. 27, 1935

2,012,822

UNITED STATES PATENT OFFICE 2,012,822

LENS FOR PHOTOGRAPHIC AND LIKE PURPOSES

Horace William Lee, Leicester, England, assignor to Kapella Limited, Leicester, England, a corporation of England Application July 20, 1934, Serial No. 736,161
In Great Britain July 22, 1933

14 Claims. (Cl. 88—57)

This invention relates to lenses for photography and the like, of the kind comprising a dispersive member between two collective members, and one of its objects is to provide lenses well corrected for axial and oblique aberrations and of larger aperture than hitherto.

Three suitable forms of lens systems embodying the present improvement are illustrated, by way of example, in the accompanying drawing, wherein:

Fig. 1 is a longitudinal section through a five-element lens system;

Fig. 2 is a longitudinal section through a six-element lens system; and

Fig. 3 is a longitudinal section through a seven-element lens system.

In this specification, I mean by:—

A system.—The complete lens system.

A member.—A separate portion of a system, generally having a distinct, though not always entirely separate, function.

A component.—A constituent part of a member, either a single lens element or two or more elements in surface contact, generally cemented together.

Element.—A single uncompounded lens.

In lens systems constructed according to the invention, the dispersive member is constituted by a compound dispersive meniscus component, preferably comprising a double convex element of relatively high refractive index, in contact with, or close to, a double concave element of higher refractive index, the difference of index being not substantially less than 0.07.

The dispersive member has the ratio of the power of its outer convex surface to that of the system not substantially less than the ratio of the focal length to the diameter of the entrance pupil.

The dispersive member preferably has a thickness greater than one-quarter of the focal length of the system.

On the convex side of said dispersive member is a collective member comprising a plurality of meniscus collective components with their concave surfaces turned toward the dispersive member.

The advantage of employing a plurality of meniscus lenses in the collective member on the convex side of the dispersive member, according to this invention, is that I am thereby enabled, while maintaining good correction for axial and oblique aberrations, to use, in the dispersive member, curves of such radius that I can attain an aperture as large as $f/1$, and this feature of my invention may be extended so as to attain even larger apertures by using three, or even more, such meniscus lenses in this collective member, and adjusting accordingly the curvatures of the dispersive member.

In every case, the collective menisci are preferably such that the ratio of the powers of any two does not exceed the value two, and the sum of their powers amounts to at least half, but does not exceed three-fourths, that of the system. Also, the convex surfaces of such meniscus collective components are preferably of successively greater radius in order counting from the dispersive member.

It is obvious that any of the collective menisci could be compounded without departing from the spirit of this invention.

The third member is constituted by either a single collective component, which may be either single or compound, a plurality of such elements, or comprises a single collective element outside a dispersive component which may be single or compounded.

One advantage of making this collective member, which is on the concave side of the dispersive member, as a single element is that there is less liability to flare. Alternatively, by dividing this into two components, I am the better enabled to perfect the zonal correction, and by compounding at least one of these components, I am the better enabled to improve the flatness of field and/or the oblique aberrations.

I now give data for the construction of three lenses of unit equivalent focal length according to my invention, illustrated in the accompanying drawing. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the components by $S_1$, $S_2$, etc.

The material is defined in terms of the mean refractive index $n_D$, as conventionally employed, followed by the Abbe V number and by the type number in Messrs. Chance Brothers' optical glass catalogue.

*Example 1.—Aperture f/1 (Figure 1)*

| Radii | Thickness | Separation | $n_D$ | V | No. |
|---|---|---|---|---|---|
| $R_1$ +1.2147 | $D_1$ .0881 | | 1.6135 | 59.4 | 8065 |
| $R_2$ +3.107 | | $S_1$ .005 | | | |
| $R_3$ +.7327 | $D_2$ .0838 | | 1.6135 | 59.4 | 8065 |
| $R_4$ +1.1855 | | $S_2$ .005 | | | |
| $R_5$ +.5042 | $D_3$ .337 | | 1.6062 | 59.8 | 4317 |
| $R_6$ −1.0516 | $D_4$ .0339 | | 1.6945 | 30.7 | (*) |
| $R_7$ +.2903 | | $S_3$ .2294 | | | |
| $R_8$ +.5939 | $D_5$ .1372 | | 1.6135 | 59.4 | 8065 |
| $R_9$ −1.9062 | | | | | |

*Example 2.—Aperture f/1 (Figure 2)*

| Radii | Thickness | Separation | $n_D$ | V | No. |
|---|---|---|---|---|---|
| $R_1$ +1.2147 | $D_1$ .0881 | | 1.6135 | 59.4 | 8065 |
| $R_2$ +3.107 | | $S_1$ .005 | | | |
| $R_3$ +.7327 | $D_2$ .0838 | | 1.6135 | 59.4 | 8065 |
| $R_4$ +1.1855 | | $S_2$ .005 | | | |
| $R_5$ +.5042 | $D_3$ .337 | | 1.6062 | 59.8 | 4317 |
| $R_6$ −1.0516 | $D_4$ .0339 | | 1.6945 | 30.7 | (*) |
| $R_7$ +.2903 | | $S_3$ .2294 | | | |
| $R_8$ +1.19 | $D_5$ .065 | | 1.6135 | 59.4 | 8065 |
| $R_9$ ∞ | | $S_4$ .005 | | | |
| $R_{10}$ +.72 | $D_6$ .075 | | 1.6135 | 59.4 | 8065 |
| $R_{11}$ ∞ | | | | | |

*Example 3.—Aperture f/1.1 (Figure 3)*

| Radii | Thickness | Separation | $n_D$ | V | No. |
|---|---|---|---|---|---|
| $R_1$ +1.215 | $D_1$ .065 | | 1.6135 | 59.4 | 8065 |
| $R_2$ +3.13 | | $S_1$ .005 | | | |
| $R_3$ +.74 | $D_2$ .065 | | 1.6135 | 59.4 | 8065 |
| $R_4$ +1.23 | | $S_2$ .005 | | | |
| $R_5$ +.51 | $D_3$ .3 | | 1.6135 | 59.4 | 8065 |
| $R_6$ −1.0 | $D_4$ .03 | | 1.6214 | 36.1 | 361 |
| $R_7$ +.275 | | $S_3$ .25 | | | |
| $R_8$ −.42 | $D_5$ .025 | | 1.651 | 33.7 | 5093 |
| $R_9$ +.5 | $D_6$ .20 | | 1.6437 | 48.3 | (*) |
| $R_{10}$ −.52 | | $S_4$ .005 | | | |
| $R_{11}$ +.68 | $D_7$ .10 | | 1.6437 | 48.3 | (*) |
| $R_{12}$ −2.09 | | | | | |

* (These numbers are not yet in Messrs. Chance Brothers' catalogue).

It will be understood that where a compound dispersive member is referred to in the appendant claims it is intended to include a member composed of elements separated by a small air space, as well as a member in which the elements are cemented together.

What is claimed is:

1. A lens system comprising a dispersing meniscus member with its convex side toward the incident light arranged between two collective members, whereof that of the convex side of said dispersive member comprises a plurality of meniscus collective components with their convex sides toward the incident light, said dispersive member comprising a double convex element of relatively high refractive index, and a double concave element having a refractive index not greatly less than that of said convex element, the ratio of the power of the front convex surface of said dispersive member to the power of the whole system being not substantially less than the ratio of the equivalent focal length to the diameter of the entrance pupil.

2. A lens system as in claim 1, in which the said double concave element has a refractive index at least 0.07 higher than that of said double convex element.

3. A lens system as in claim 1, in which the thickness of said dispersive member is greater than one-quarter of the focal length of the system as a whole.

4. A lens system comprising a dispersive compound two-element meniscus member with its convex side toward the incident light arranged between two collective members, whereof that on the convex side of said dispersive member comprises a plurality of meniscus collective components with their convex sides toward the incident light, and the facing surfaces of the two elements of the compound meniscus member are strongly curved and concave toward the incident light.

5. A lens system as in claim 4, in which said facing surfaces have a radius of the order of magnitude of the focal length of the lens system as a whole.

6. A lens system as in claim 1, in which the convex surfaces of the said collective components are of successively greater radius in order counting from the dispersive member.

7. A lens system, comprising an outer collective member comprising a plurality of meniscus collective components with their convex sides toward the incident light, an intermediate dispersing two-element compound meniscus member with its convex side toward the incident light, the contacting or adjacent surfaces of the two elements being strongly curved and concave toward the incident light, and an inner collective member, the radii of the convex surfaces of the said components and the said compound meniscus member decreasing progressively from the outermost surface of the lens system inwardly.

8. A lens system as in claim 1, in which the ratio of the powers of any two of the collective meniscus components constituting the member on the convex side of the dispersive member does not exceed the value two.

9. A lens system as in claim 1, in which the collective member on the concave side of the dispersive meniscus component is a single element.

10. A lens system as in claim 1, in which the collective member on the concave side of the dispersive member comprises a plurality of separated collective components.

11. A lens system comprising a single dispersive compound meniscus member with its convex side toward the incident light arranged between two collective members, whereof that on the convex side of said dispersive member comprises a plurality of meniscus collective components with their concave surfaces turned toward the dispersive member.

12. A lens system comprising a single dispersive compound meniscus member with its convex side toward the incident light arranged between two or more collective members, the dispersive meniscus member comprising a double convex element of relatively high refractive index and a double concave element of higher refractive index, the difference of index being not substantially less than 0.07, and having the ratio of the power of its outer convex surface to that of the whole system not substantially less than the ratio of the equivalent focal length to the diameter of the entrance pupil.

13. A lens system as in claim 12, in which the thickness of said dispersive member is greater than one-quarter of the focal length of the system as a whole.

14. A lens system comprising a dispersive meniscus member having a thickness greater than one-quarter of the focal length of the lens system as a whole, arranged with its convex side toward the incident light and located between two collective members, whereof that on the convex side of said dispersive member comprises a plurality of meniscus collective components with their convex sides toward the incident light, said dispersive member comprising a double convex element of relatively high refractive index, and a double concave element having a refractive index not greatly less than that of said convex element, the contacting or adjacent surfaces of said elements being strongly curved and concave toward the incident light, the ratio of the power of the front convex surface of said dispersive member to the power of the whole system being not substantially less than the ratio of the equivalent focal length to the diameter of the entrance pupil.

HORACE WILLIAM LEE.